United States Patent [19]

Starner

[11] Patent Number: 5,079,968
[45] Date of Patent: Jan. 14, 1992

[54] ROTATING BICYCLE SHOE CLEAT

[76] Inventor: Alan L. Starner, 9852 W. Katella Ave. #334, Anaheim, Calif. 92804

[21] Appl. No.: 684,650

[22] Filed: Apr. 12, 1991

Related U.S. Application Data

[63] Continuation-in-part of Ser. No. 510,518, Apr. 18, 1990, abandoned, which is a continuation-in-part of Ser. No. 388,067, Jul. 31, 1989, abandoned.

[51] Int. Cl.$^5$ .......................... G05G 1/14; A43B 5/00
[52] U.S. Cl. ...................................... 74/534.6; 36/131
[58] Field of Search ...................... 74/594.4–594.6; 36/131, 132

[56] References Cited

U.S. PATENT DOCUMENTS

| 1,991,855 | 2/1935 | Johnson | 280/11/3 |
| 4,298,210 | 11/1981 | Lotteau et al. | 74/594.6 X |
| 4,377,952 | 3/1983 | Gamondes | 36/131 X |
| 4,686,867 | 8/1987 | Bernard et al. | |
| 4,807,372 | 2/1989 | McCall | 36/131 |
| 4,815,333 | 3/1989 | Sampson | |
| 4,827,633 | 5/1989 | Feldstein | 74/594.6 X |
| 4,864,887 | 9/1989 | Rapisarda | 74/594.6 |
| 4,890,507 | 1/1990 | Farris et al. | 74/594.4 |
| 4,893,420 | 1/1990 | Bezin et al. | 74/594.6 |
| 4,898,063 | 2/1990 | Sampson | 74/594.6 |

FOREIGN PATENT DOCUMENTS

| 3315282 | 10/1984 | Fed. Rep. of Germany | 74/594.6 |
| 3329993 | 3/1985 | Fed. Rep. of Germany | 74/594.6 |
| 2279607 | 2/1976 | France | 74/594.6 |
| 2609270 | 7/1988 | France | 74/594.6 |
| 183582 | 10/1980 | Italy | 74/594.6 |
| 8707120 | 12/1987 | PCT Int'l Appl. | 36/131 |
| 2202499 | 9/1988 | United Kingdom | 74/594.6 |

OTHER PUBLICATIONS

Zahradnik, "Custom Pedals," Bicycling, Apr. 1990, p. 42.
"It's Time to Look Again", Bicycle Guide, Mar. 1990, p. 55.
Berto, "A Pedal Revolution," Bicycling, Apr. 1989, pp. 172–177, 180–182.
"Here'Why More Than 100 Top Pros Ride with Time," Bicycling Guide, Mar. 1990, p. 59.

Primary Examiner—Vinh T. Luong
Attorney, Agent, or Firm—Robert T. Spaulding

[57] ABSTRACT

A rotating bicycle shoe cleat consisting of an outer stationary structure and an inner, rotating structure. The stationary structure has front and rear locking portions which allow rigid engagement to a spring loaded clipless bicycle pedal. The rotary structure is mounted on the sole of a bicycle shoe. The two structures share a common axis of rotation. This common axis allows the rotary structure to pivot within the stationary structure when there is a dynamic lateral rotational force present. The amount of rotation is controlled by suitably located compression pads and limiting embrasures. In addition, the compression pads act as dampers. In all other respects, the rotating bicycle shoe cleat functions as a standard bicycle shoe cleat.

4 Claims, 4 Drawing Sheets

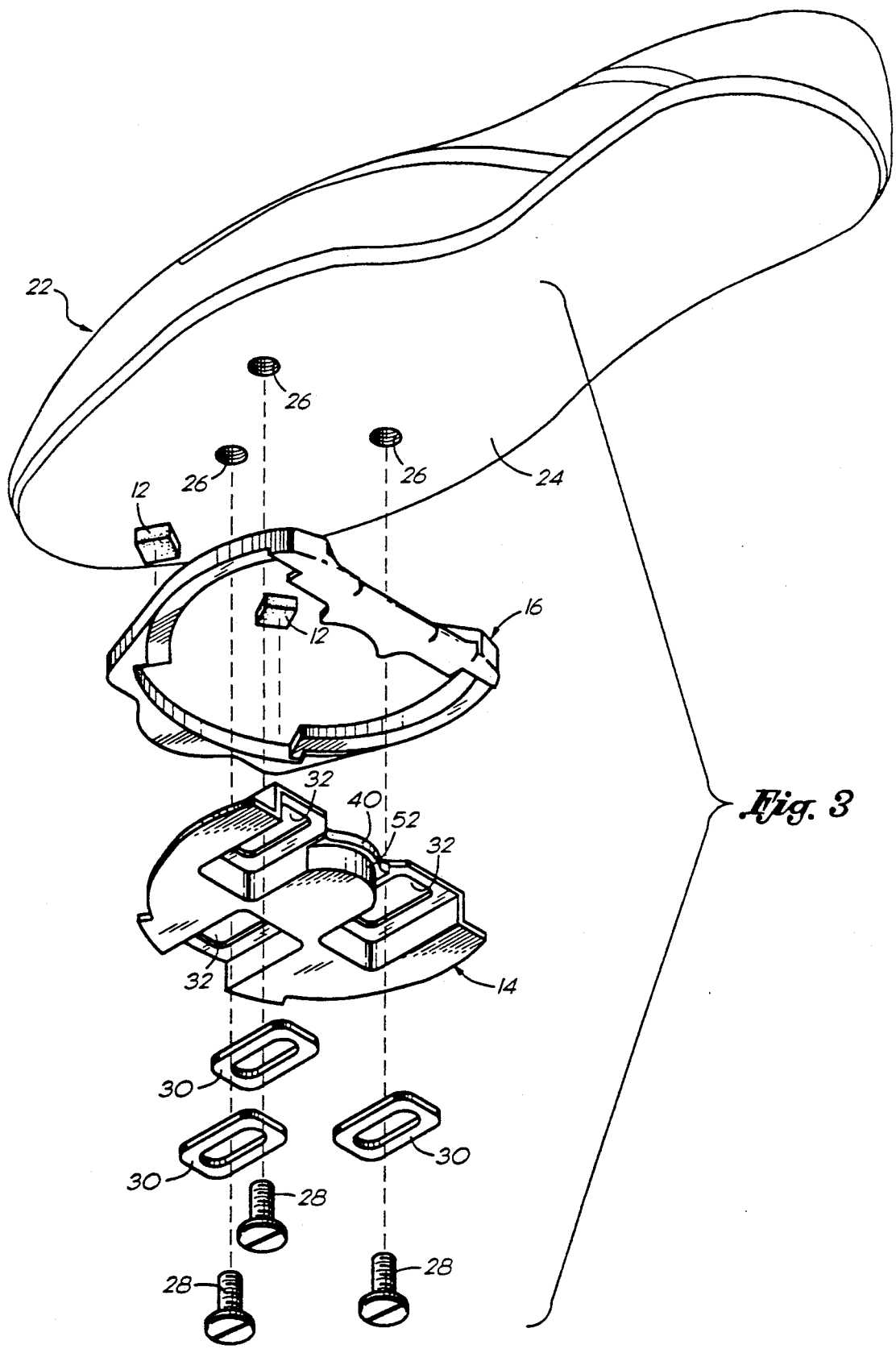

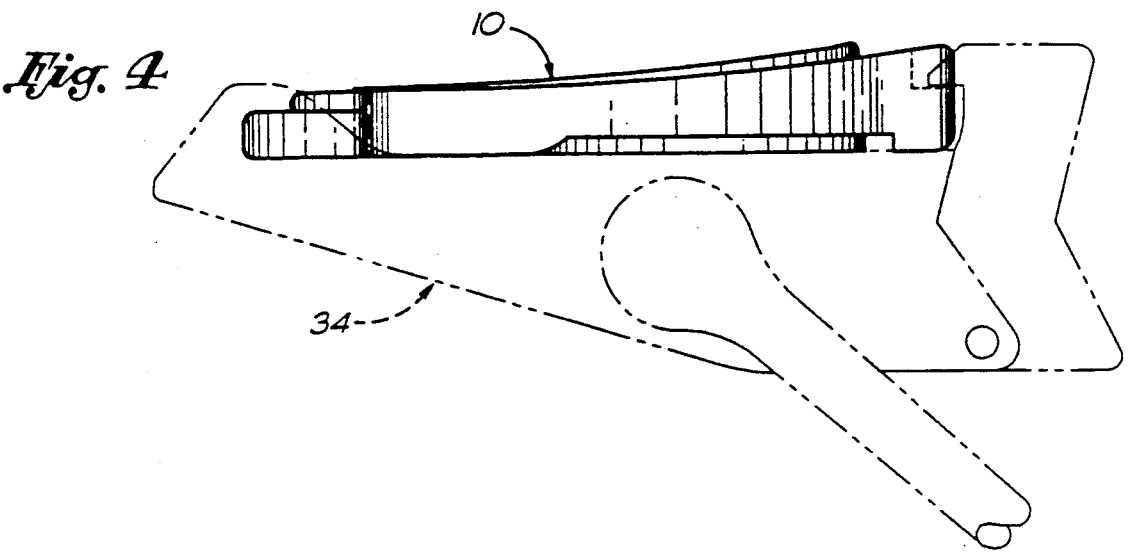
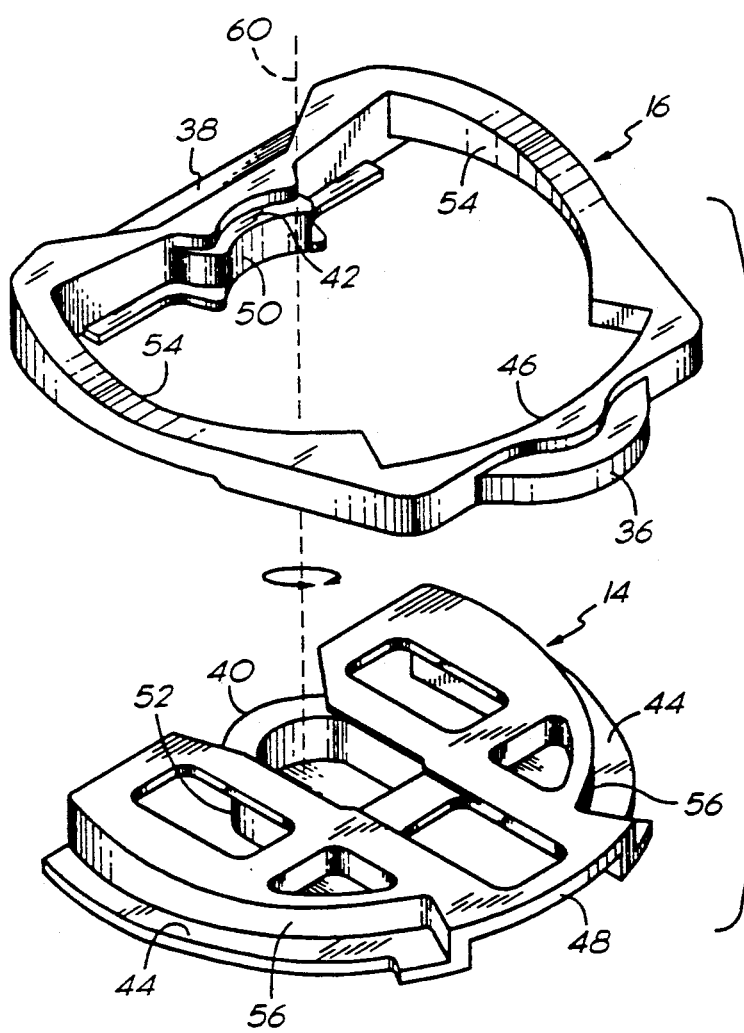

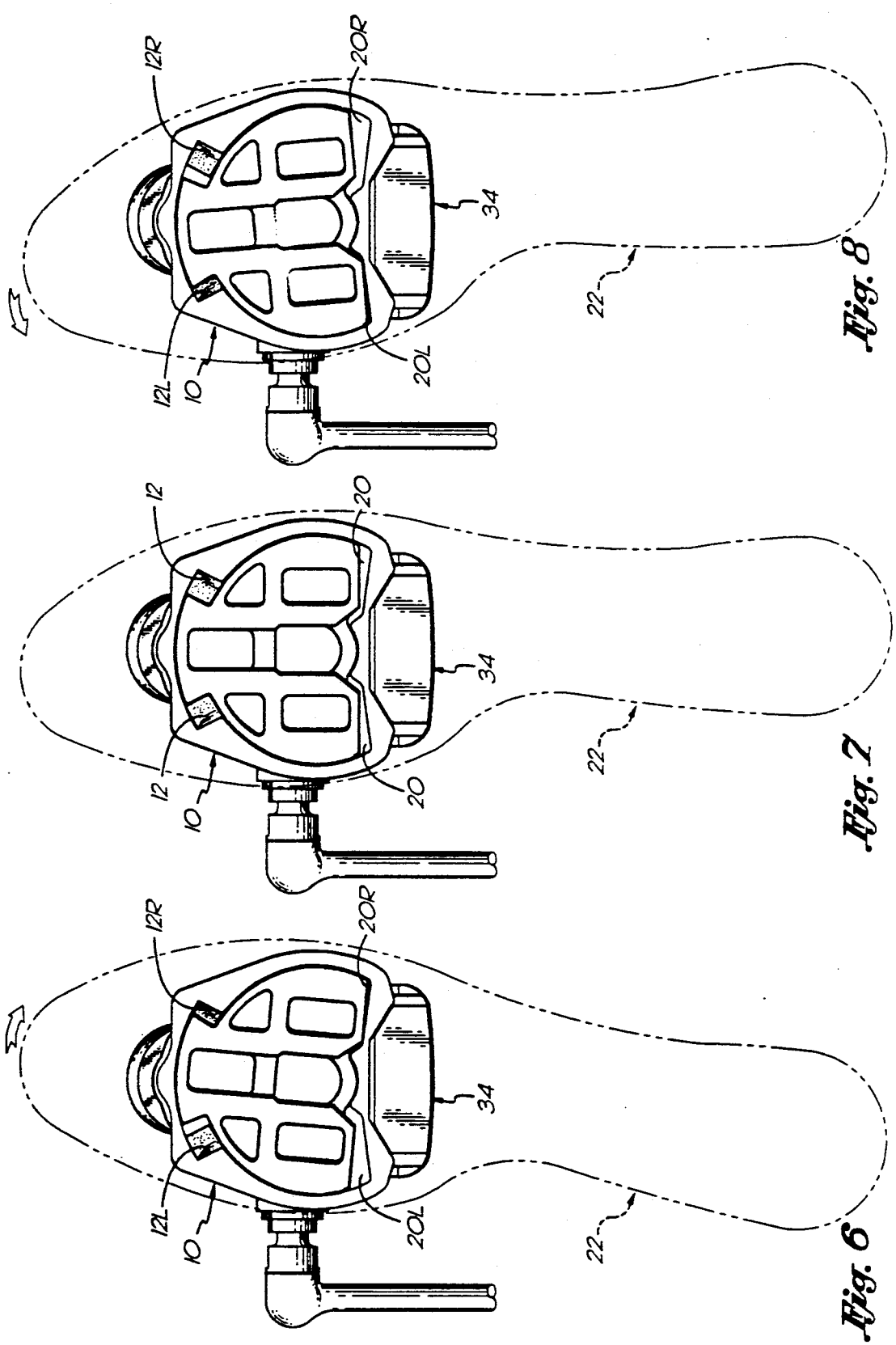

ROTATING BICYCLE SHOE CLEAT

This application is a continuation-in-part of abandoned application Ser. No. 510,518 filed Apr. 18, 1990, which in turn is a continuation-in-part of abandoned application Ser. No. 388,067 filed July 31, 1989.

BACKGROUND OF THE INVENTION

1) Field of the Invention

This invention relates generally to bicycle shoe cleats and more specifically to a bicycle shoe cleat with dynamic lateral rotational capability.

2) Description of the Prior Art

Bicycle shoe cleats are well known in the art, for example, U.S. Pat. No. 4,686,867. When interfaced between a suitably shaped bicycle pedal and bicycle shoe, these devices incorporate the highly desireable quick engage, quick release feature. However, in so doing, the bicycle shoe and hence the bicyclists foot, is rigidly locked in place. So locked, the normal lateral rotation of the foot during a pedal stroke is inhibited. This unnatural pedal stroke is a common source of physiological discomfort.

Accordingly, one object and advantage of this invention is to provide a bicycle shoe cleat which will allow dynamic pivotal rotation of the bicycle shoe with respect to the bicycle pedal.

Another object and advantage of this invention is that small movements of the shoe will not cause disengagement of the cleat from the pedal.

Another object and advantage of this invention is compatibility with currently available clipless bicycle pedals.

Further objects and advantages of this invention will become apparent from a consideration of the drawings and ensuing description of it.

SUMMARY OF THE INVENTION

The present invention comprises two cardiod shaped body structures, one slightly smaller and imbedded within the larger structure. The larger structure, henceforth called the stationary structure, has locking portions which may be rigidly engaged by an attachment mechanism of a bicycle pedal which is preferably of a spring loaded type. The smaller structure, henceforth called the rotary structure, is mounted onto the sole of a bicycle shoe. The rotary structure and the stationary structure share a common axis, or pivot point, thereby allowing the rotary structure/bicycle shoe combination to rotate with respect to the stationary structure/bicycle pedal combination. This lateral rotation, both clockwise and anti-clockwise, is limited in scope and dampened in intensity by compressible pads. Further, these compressible pads are so located as to encourage the rotary structure/bicycle shoe combination to seek coaxial alignment with the stationary structure/bicycle pedal combination when there is no lateral rotational force present.

BRIEF DESCRIPTION OF THE DRAWINGS

FIG. 3 shows an exploded view of the rotating bicycle shoe cleat as it is mounted on a bicycle shoe.

FIG. 4 shows a cutaway view of the rotating bicycle shoe cleat as it is attached to a clipless bicycle pedal.

FIG. 5 shows an exploded view of the rotating bicycle shoe cleat.

FIG. 6 shows a cutaway drawing of a rotating bicycle shoe cleat attached to a bicycle pedal. Cleat is in full clockwise rotation.

FIG. 7 shows a cutaway drawing of a rotating bicycle shoe cleat attached to a bicycle pedal. Cleat is in the neutral position.

FIG. 8 shows a cutaway drawing of a rotating bicycle shoe cleat attached to a bicycle pedal. Cleat is in full anti-clockwise rotation.

DESCRIPTION OF THE PREFERRED EMBODIMENT

Figure 1:
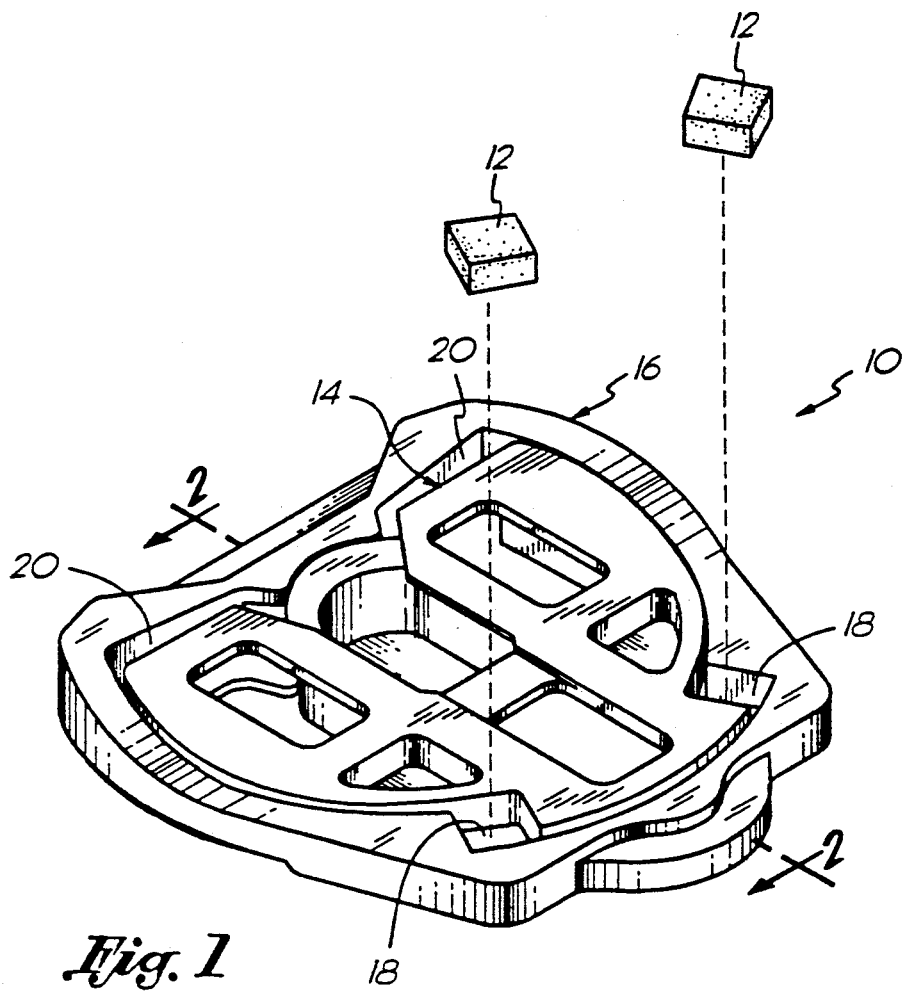
FIG. 1 shows an assembled view of the rotating bicycle shoe cleat with the compressible pas offset for clarity.
Figure 2:
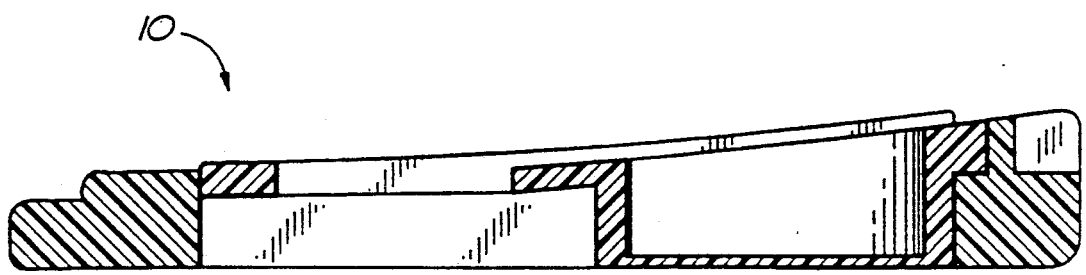
FIG. 2 shows a cutaway of FIG. 1 through section 2—2.

FIG. 1 shows a perspective view of an assembled rotating bicycle shoe cleat 10 with the compressible pads 12 offset for clarity. The rotary structure 14 and the stationary structure 16 are so shaped that, upon assembly, two sets of pad cavities 18 are formed at the narrow end of the cardiod shaped cleat. These two cavities 18 form pockets for the compressible pads 12. At the wide end of the cleat there are two rotation limit embrasures 20.

FIG. 3 shows an exploded view of the rotating bicycle shoe cleat 10 FIG. 1 as it is mounted on a bicycle shoe 22. The sole 24 of the bicycle shoe is predrilled and threaded with three suitably located mounting holes 26. In assembly, the cleat is attached to the sole by three mounting screws 28. Each mounting screw passes through a slotted rectangular washer 30. The slotted washers allow optimum placement of the cleat on the shoe. Further, each washer is located within a rectangular slot 32 in the rotary structure 14. Upon assembly, the rotary structure is firmly attached to the sole of the bicycle shoe.

FIG. 4 shows a cutaway drawing of a rotating bicycle shoe cleat 10 as it is attached to a clipless bicycle pedal 34. The cleat is held rigidly in place by a front locking portion 36 FIG. 5 located on the stationary structure 16 FIG. 5, and a rear locking portion 38 FIG. 5, also located on the stationary structure. Thus described, the bicycle shoe cleat forms an interface between the bicycle shoe sole 24 FIG. 3 and the clipless bicycle pedal.

FIG. 5 shows an exploded view of the rotating bicycle shoe cleat 10 FIG. 1. Rear concave surface 50, front concave surface 46 and the side concave surfaces 54 of the stationary structure 16 are all concentric to rotation axis 60. Similarly, rear convex surface 52, front convex surface 48 and the side convex surfaces 56 of the rotary structure 14 are all concentric to rotation axis 60. In assembly, the rotary structure 14 snaps into place within the stationary structure 16. The mounting lip 40 FIG. 3 of the rotary structure rides over the mounting notch 42 of the stationary structure, locking the rotary structure in place. Rear convex surface 52 FIG. 3 abuts against rear concave surface 50; front convex surface 48 abuts against front concave surface 46; and side convex surfaces 56 abut against side concave surfaces 54, thus preventing lateral movement to the front, back and sides, while allowing rotation about rotation axis 60. The peripheral retention lips 44 retain the stationary structure from a vertical downward movement; when the cleat is attached to a bicycle shoe 22 FIG. 3, the stationary structure 16 is retained between the peripheral retention lips and the undersurface of the bicycle shoe.

FIG. 6 shows a cutaway view of the rotating bicycle shoe cleat 10. The cleat is mounted on a clipless bicycle pedal 34. In this drawing, the bicycle shoe 22 is in full clockwise rotation with respect to the pedal. The right compressible pad 12R is under full compression, the left compressible pad 12L is not under strain. The right rotation limit embrasure 20R is fully closed, the left limit embrasure 20L is fully open. The energy stored in the right compressible pad will facilitate the return of the cleat to the neutral position when the clockwise dynamic rotational force is removed.

FIG. 7 shows a cutaway view of the rotating bicycle shoe cleat 10. The cleat is mounted on a clipless bicycle pedal 34. In this drawing, the bicycle shoe 22 is in coaxial alignment with the pedal. Hence the cleat is in a neutral position, that is, neither of the compressible pads 12 is under stress, and the two rotation limit embrasures 20 are of equal area.

FIG. 8 shows a cutaway view of the rotating bicycle shoe cleat 10. The cleat is mounted on a clipless bicycle pedal 34. In this drawing, the bicycle shoe 22 is in full anti-clockwise rotation with respect to the pedal. The left compressible pad 12L is under full compression, the right compressible pad 12R is not under strain. The left rotation limit embrasure 20L is fully closed, the right rotation limit embrasure 20R is fully open. The energy stored in the left compressible pad will facilitate the return of the cleat to the neutral position when the anti-clockwise dynamic rotational force is removed.

Based on the description of FIGS. 6, 7, and 8, it can be seen that the shoe may rotate dynamically with respect to the pedal during a pedal stroke. In all other respects, the rotating bicycle shoe cleat functions as a standard bicycle shoe cleat.

Although alternative production methods could be used, the stationary structure and rotating structure would be made of an engineering plastic via plastic injection molding technology.

Although the description above contains many specifications, these should not be construed as limiting the scope of the invention but as merely providing illustrations of some of the presently preferred embodiments of this invention. For example, the stationary structure and the rotary structure could be formed from die cast metal, the compressible pads could be replaced with springs, etc.

In addition, although the rotating bicycle shoe cleat has been designed for bicycles, it could be used in other pedaling applications, as well as to sports such as rowing where it is desireable to interface a shoe to a mechanical device.

Thus the scope of the invention should be determined by the appended claims and their legal equivalents, rather than by the examples given.

I claim:

1. A rotating bicycle shoe cleat comprising an inner rotary structure having a plurality of convex surfaces, a mounting lip, a plurality of rectangular mounting slots, and a plurality of retention lips; an outer stationary structure having a plurality of concave surfaces, each of which abuts against a corresponding convex surface of said inner rotary structure, and a mounting notch which rides under the mounting lip of the inner rotary structure; the structures having in common a plurality of rotation limit embrasures whereby the inner rotary structure may dynamically rotate within the outer stationary structure subject to the restraints of the rotation limit embrasures.

2. The rotating bicycle shoe cleat of claim 1, further including a plurality of pad cavities.

3. The rotating bicycle shoe cleat of claim 2, wherein said pad cavities contain compressible pads which resist the dynamic rotation.

4. The stationary structure of claim 1, further including a front and rear locking portion.

* * * * *